under>(12) United States Patent
Steegmüller et al.

(10) Patent No.: US 7,223,952 B2
(45) Date of Patent: May 29, 2007

(54) OPTICAL SENSING HEAD AND METHOD FOR FABRICATING THE SENSING HEAD

(75) Inventors: Ulrich Steegmüller, Regensburg (DE); Wolfgang Gramann, Regensburg (DE); Frank Singer, Regenstauf (DE); Jürgen Dachs, Reichertshofen (DE); Mathias Kämpf, Burglengenfeld (DE)

(73) Assignee: Osram Opto Semiconductor GmbH, Regensburg (DE)

( * ) Notice: Subject to any disclaimer, the term of this patent is extended or adjusted under 35 U.S.C. 154(b) by 264 days.

(21) Appl. No.: 10/667,717

(22) Filed: Sep. 22, 2003

(65) Prior Publication Data

US 2004/0069933 A1  Apr. 15, 2004

Related U.S. Application Data

(60) Provisional application No. 60/412,296, filed on Sep. 20, 2002.

(30) Foreign Application Priority Data

Sep. 20, 2002  (DE) ................ 102 43 756
Nov. 19, 2002  (DE) ................ 102 53 907

(51) Int. Cl.
    *G01B 7/00* (2006.01)
(52) U.S. Cl. .................. 250/201.5; 369/112.01
(58) Field of Classification Search ............ 250/201.5, 250/216, 208.1, 205; 369/44.14, 44.23, 112, 369/112.01
See application file for complete search history.

(56) References Cited

U.S. PATENT DOCUMENTS

| 4,978,187 A | 12/1990 | Minemura et al. |
| 5,446,719 A | 8/1995 | Yoshida et al. |
| 5,689,108 A | 11/1997 | Ohyama |
| 6,072,607 A * | 6/2000 | Tajiri et al. .............. 369/44.14 |
| 6,104,690 A | 8/2000 | Feldman et al. |
| 6,137,102 A | 10/2000 | Späth et al. |
| 6,346,695 B2 * | 2/2002 | Yanagawa et al. ......... 250/205 |
| 6,385,157 B1 | 5/2002 | Nakano |
| 6,449,296 B1 | 9/2002 | Hamasaki et al. |

(Continued)

FOREIGN PATENT DOCUMENTS

DE  197 48 324 A1  5/1999

(Continued)

*Primary Examiner*—Kevin Pyo
(74) *Attorney, Agent, or Firm*—Laurence A. Greenberg; Werner H. Stemer; Ralph E. Locher

(57) ABSTRACT

An optical sensing head, which is for reading out an optical data memory, has a substrate with a main surface. An edge-emitting laser component is configured on the main surface of the substrate and has irradiation axis oriented essentially parallel to the first main plane. A deflection device is arranged on the main surface of the substrate and deflects the laser radiation in a direction that is essentially perpendicular to the main surface. At least one signal detector is provided for sensing the laser radiation that is reflected by the optical data memory. An optical element guides the deflected laser radiation to the optical data memory and guides reflected laser radiation to the signal detector. The optical element is connected to the substrate by at least one supporting element. The invention also includes a method for fabricating such a sensing head.

21 Claims, 7 Drawing Sheets

U.S. PATENT DOCUMENTS

| | | |
|---|---|---|
| 6,501,868 B1 | 12/2002 | Kitaoka et al. |
| 6,535,473 B1* | 3/2003 | Swanson et al. ....... 369/112.01 |
| 6,680,900 B1* | 1/2004 | Takahashi et al. .......... 369/300 |
| 6,873,580 B2* | 3/2005 | Zimmer et al. .......... 369/44.12 |
| 6,914,868 B1* | 7/2005 | Redmond et al. ...... 369/112.01 |
| 2004/0114502 A1* | 6/2004 | Takahashi et al. .......... 369/300 |
| 2006/0153058 A1* | 7/2006 | Takahashi et al. .......... 369/300 |

FOREIGN PATENT DOCUMENTS

| | | |
|---|---|---|
| EP | 0 555 097 A1 | 8/1992 |
| JP | 2001183540 A | 7/2001 |

* cited by examiner

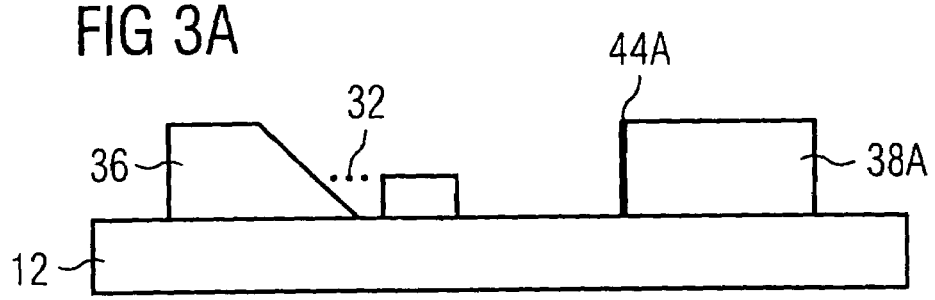
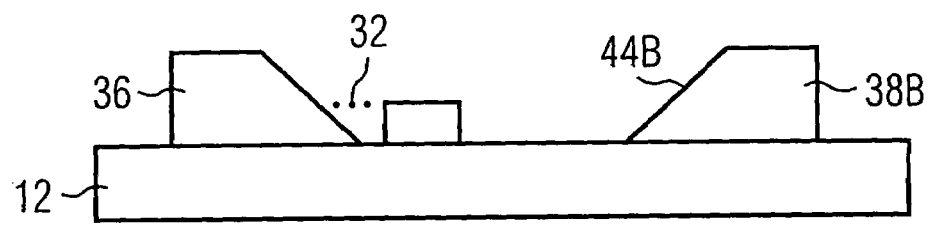
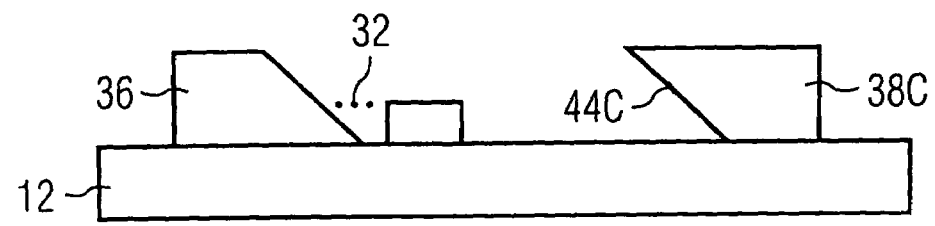

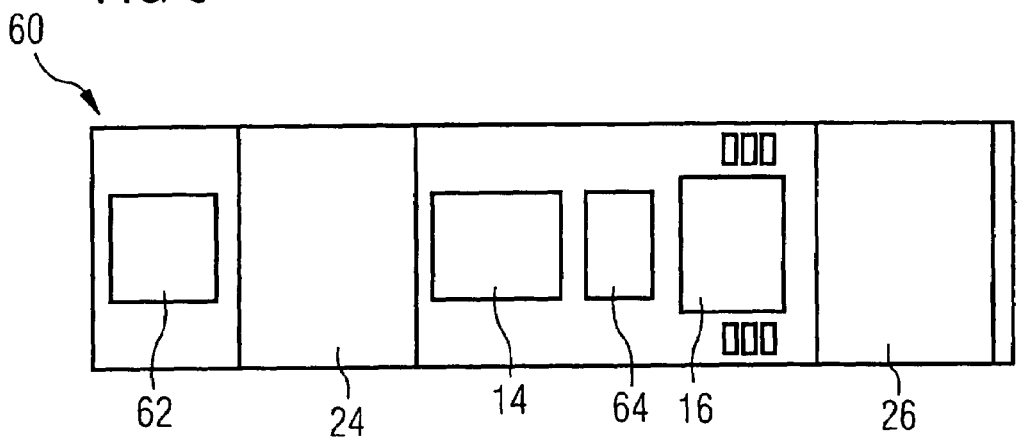
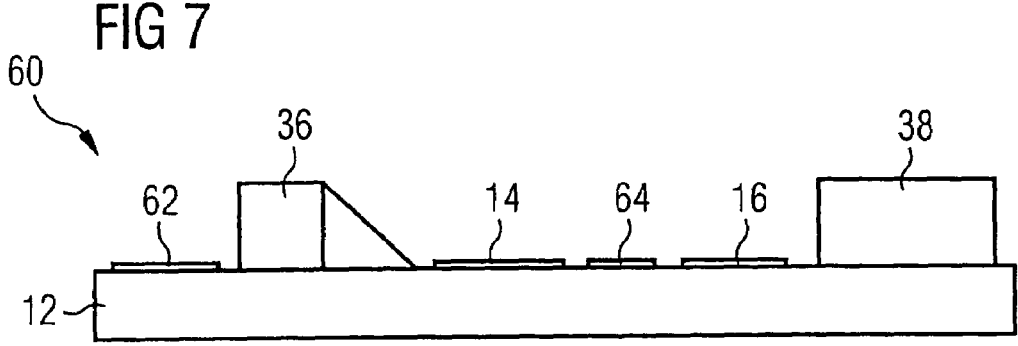
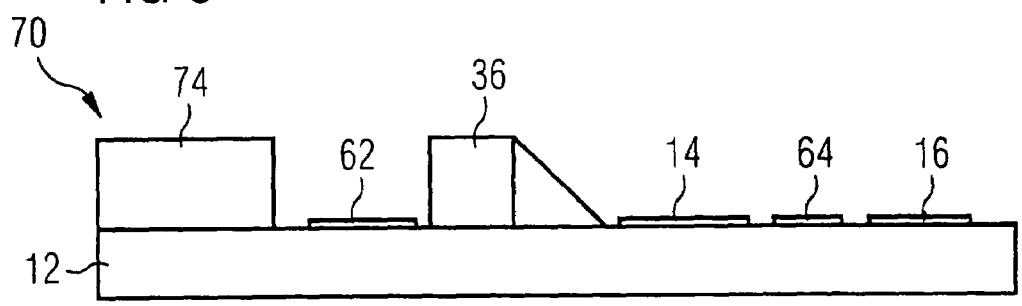

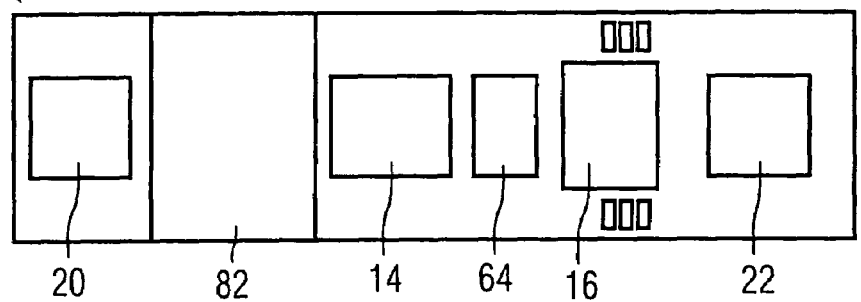
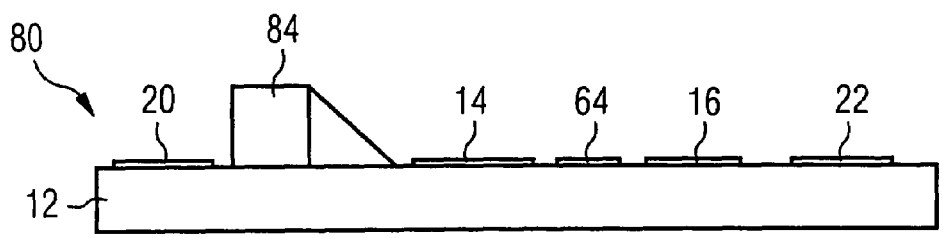
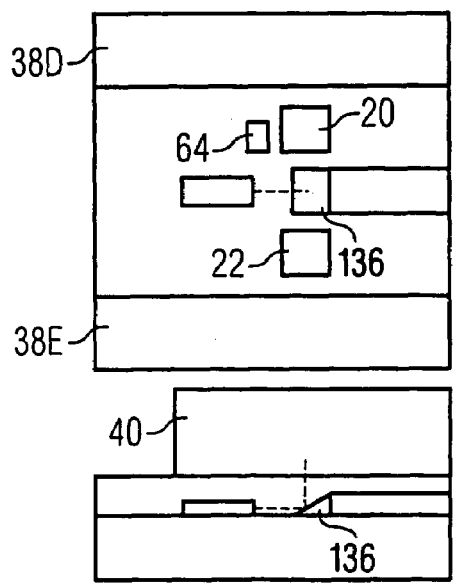

OPTICAL SENSING HEAD AND METHOD FOR FABRICATING THE SENSING HEAD

CROSS-REFERENCE TO RELATED APPLICATION

This application claims the benefit under 35 U.S.C. § 119(e) of copending provisional application No. 60/412,296, filed Sep. 20, 2002.

BACKGROUND OF THE INVENTION

Field of the Invention

The invention relates to an optical sensing head, in particular for reading out an optical data memory, and to a method for fabricating such a sensing head.

A conventional optical sensing head, such as is used for example in a CD (compact disk) player or a DVD (digital video disk) player, is generally composed of discrete active and passive components which are produced individually and installed in a hybrid fashion in a metal housing. Such a sensing head typically includes a laser source, optical components such as lenses and beam splitters, a deceleration plate, and detectors for monitor functions and signal functions. In order to measure the tracking, spacing and signal level, the signal detector senses the light that is emitted by the laser diode and reflected by the CD or DVD. The monitor detector is used to check the emitted laser power.

The monitor detector is generally arranged in the vicinity of the laser source. For example it is possible to provide for some of the laser beam to strike a monitor photodiode directly behind a housed laser diode. The signal detector is typically mounted as a single component on the metal housing of the sensing head.

Such a sensing head has a size of approximately 30 mm×40 mm and is relatively large and heavy as a result of the discrete design. The monitor detector and the signal detector are located in separate housings and must be individually adjusted.

SUMMARY OF THE INVENTION

It is accordingly an object of the invention to provide an optical sensing head and a method for producing the optical sensing head, which overcome the above-mentioned disadvantages of the prior art apparatus and methods of this general type.

In particular, it is an object of the invention to provide an optical sensing head that has a low weight and a small spatial requirement and whose components can easily be matched to one another. The intention is also to provide a fabrication method for such an optical sensing head, which permits cost-effective fabrication and mounting.

With the foregoing and other objects in view there is provided, in accordance with the invention, an optical sensing head, which is of the type mentioned at the beginning, having a substrate with a main surface, and an edge-emitting laser component arranged on the main surface of the substrate. The irradiation axis of the edge-emitting laser is oriented essentially parallel to the first main plane. The optical sensing head also has a deflection device configured on the main surface of the substrate. The deflection device has the purpose of deflecting the laser radiation in a direction which is essentially perpendicular to the main surface. The optical sensing head also has at least one signal detector for sensing the laser radiation which is reflected by the optical data memory, and an optical element which guides the deflected laser radiation to the optical data memory and guides reflected laser radiation to the at least one signal detector. The optical element is connected to the substrate via at least one supporting element.

By integrating a plurality of functions on a single substrate (submount), it is possible to achieve a very small size, and associated therewith, a sensing head with a low weight. This permits the sensing head to be used in particular for mobile applications such as cameras, music playback devices, games consoles, electronic books (eBooks), PDAs, laptops or computer peripherals. Furthermore, the integration permits cost-effective fabrication and mounting methods to be used so that the sensing head can be fabricated more cost-effectively than conventional pickup systems. Because of the low weight of the sensing head, faster access times than with conventional pickup systems can be achieved.

In one preferred refinement of the optical sensing head, the deflection device is embodied simultaneously as a supporting element via which the optical element is connected to the substrate.

An irradiation-direction signal detector is advantageously arranged on the main surface of the substrate on the irradiation axis of the laser component and downstream of the deflection device in the irradiation direction. The laser component, the deflection device and the irradiation-direction signal detector are thus arranged in this sequence one behind the other on a straight line.

It is also preferred if an opposite-direction signal detector is arranged on the main surface of the substrate on the irradiation axis of the laser component and in the opposite direction to the irradiation direction of the laser component, as an alternative to or in addition to the irradiation-direction signal detector.

A supporting element via which the optical element is connected to the substrate is advantageously arranged between the laser component and the opposite-direction signal detector. In this context it is preferred if the supporting element, which is arranged between the laser component and the opposite-direction signal detector, is provided with a metallic or a dielectric mirrored layer on its surface facing the laser component. As a result, it is possible to effectively counteract stray light of the laser component passing into the opposite-direction signal detector.

Alternatively, the supporting element which is arranged between the laser component and the opposite-direction signal detector can be provided with an absorption layer on its surface facing the laser component. This also effectively suppresses stray light passing in.

An even more wide-ranging reduction in stray light which passes in can be achieved by virtue of the fact that the supporting element which is arranged between the laser component and the opposite-direction signal detector is embodied as a deflection device which deflects away stray light of the laser component from the opposite-direction signal detector. The supporting element advantageously deflects the stray light in a direction essentially perpendicular to the main surface.

The integration of an optical sensing head can be increased further by virtue of the fact that the signal detector (or more than one signal detector) is formed in the substrate. The signal detector preferably includes an array of PIN photodiodes that are formed in the substrate.

In one preferred development of the optical sensing head, a monitor detector for checking the irradiated power of the laser component is also integrated on the substrate.

In a further embodiment, the supporting elements are arranged to the side of the deflection mirror, and the detectors are installed between the mirror and the supporting elements. The optical element is mounted on the supporting elements.

The substrate is advantageously formed by a silicon substrate. Cost-effective processes of the semiconductor industry can then be used for the fabrication and mounting method.

The at least one supporting element and/or the deflection device are expediently produced from glass and are connected nondetachably to the substrate for example by bonding or anodic bonding.

The main surface of the substrate preferably has an area of 10 mm² or less.

With the foregoing and other objects in view there is provided, in accordance with the invention, a method for fabricating the optical sensing head described above. The method involves fabricating a deflection device. Fabricating the deflection device includes a step of sawing a glass wafer into individual strips. Fabricating the deflection device also includes a step of grinding surfaces onto the strips at a predetermined angle, in particular at an angle of approximately 45°. Fabricating the deflection device also includes a step of coating the ground surfaces with a highly reflective mirrored layer in order to obtain a deflection prism for the deflection of laser beams. Fabricating the deflection device also includes a step of orientating and non-detachably connecting the deflection prisms to the substrate.

The deflection prisms are advantageously connected to the substrate by anodic bonding. Before the glass wafer is sawn, regions on the front side of the glass wafer are expediently metalized in order to provide soldering surfaces for connecting optical components to the substrate after the connection of the deflection prisms. It is also preferred to introduce trenches into the rear side of the glass wafer by sandblasting before the glass wafer is sawn.

In a particularly advantageous refinement of the method, the supporting elements are fabricated from the glass wafer at the same time as the deflection device.

An array of PIN photodiodes is preferably formed in the substrate as signal detector/detectors.

Other features which are considered as characteristic for the invention are set forth in the appended claims.

Although the invention is illustrated and described herein as embodied in an optical sensing head and a method for fabricating the sensing head, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 3A, 3B, and 3C are schematic views showing three variants for suppressing laser stray light;

FIG. 6 is a plan view of a third exemplary embodiment of a silicon submount;

FIG. 7 is a sectional view taken through the silicon submount in FIG. 6 after the glass prisms have been mounted;

FIG. 8 is a sectional view taken through a fourth embodiment of a silicon submount;

FIG. 9 is a plan view of a fifth exemplary embodiment of a silicon submount;

FIG. 10 is a sectional view taken through the silicon submount in FIG. 9 after the glass prisms have been mounted;

FIG. 11 includes a plan view of a sixth embodiment of a silicon submount and a sectional view taken through the same submount;

DESCRIPTION OF THE PREFERRED EMBODIMENTS

Figure 1:
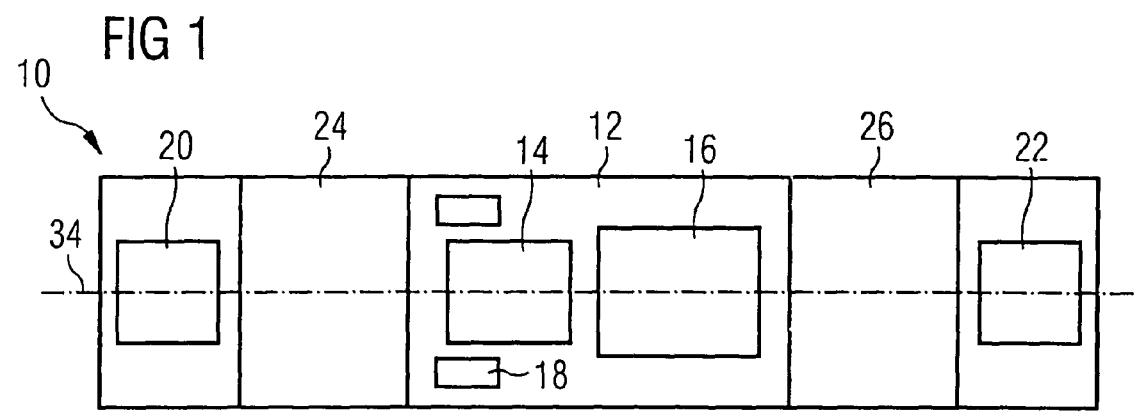
FIG. 1 is a schematic plan view of a first embodiment of a silicon submount before the glass prisms are mounted.
Figure 2:
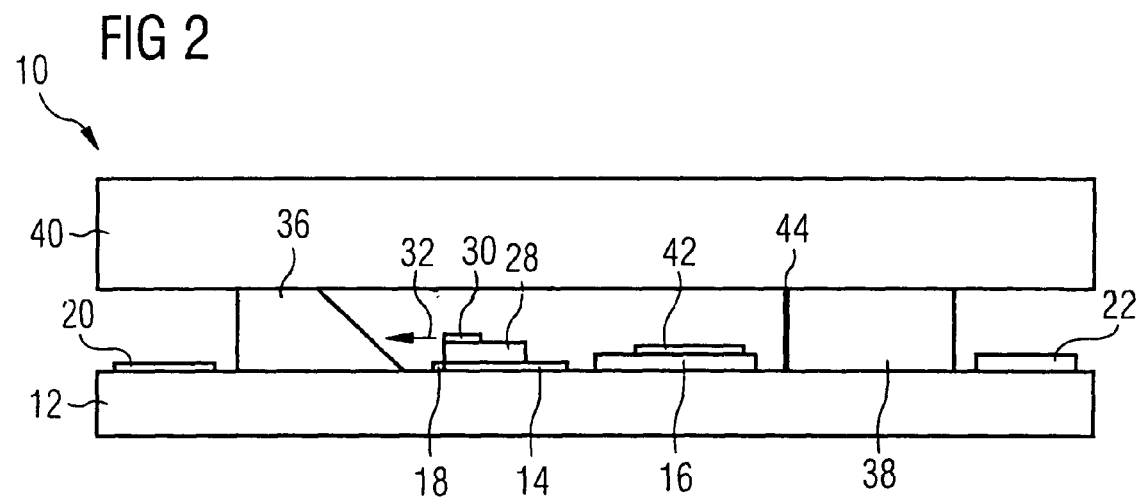
FIG. 2 is a sectional view taken through the silicon submount in FIG. 1 after the glass prisms, the laser, and the optical components have been mounted.

Referring now to the figures of the drawing in detail and first, particularly, to FIGS. 1 and 2 thereof, there is shown a first exemplary embodiment of the invention. FIG. 1 shows a plan view of a silicon submount, which is generally designated by 10, before the glass prisms are mounted, and FIG. 2 shows the submount 10 after laser and optical components are mounted.

The silicon submount 10 contains a silicon substrate 12 with a size of approximately 1.3 mm×4.8 mm, which has chip bonding surfaces 14 and 16, two monitor photodiodes 18 and two signal diodes 20 and 22. A heat sink 28 is mounted on the chip bonding surface 14, and an edge-emitting laser diode 30, which emits red laser radiation 32 along the irradiation axis 34 during operation, is mounted on the heat sink 28. The chip bonding surface 16 has an integrated circuit 42, for example, an amplifier circuit or a laser driver circuit.

Two glass prisms 36 and 38 are connected nondetachably to the substrate 12 on the glass bonding surfaces 24 and 26 by anodic bonding. The glass prisms are used, on the one hand, as supporting elements on which an optical component 40 is mounted, for example by soldering. The glass prism 36 also serves as a deflection prism for deflecting the laser radiation 32, which is emitted parallel to the surface of the substrate 12 along the irradiation axis 34, by 90°.

The optical component 40 guides the deflected laser radiation to an optical storage medium (not illustrated itself) and guides the laser radiation reflected there back to the signal diodes 20 and 22. The signals which are modulated onto the storage medium in accordance with a dash pattern or dot pattern are used in a manner known per se for data transmission, and for tracking detection and tracking guidance, after they have been sensed by the signal diodes 20 and 22.

The surface of the glass prism 38 facing the laser diode 30 is mirror-coated with an aluminum layer 44 to prevent stray radiation from passing from the laser diode 30 to the signal diode 22. Instead of an aluminum layer, it is also possible to provide the glass prism with a different metallic layer, for example, an AlSi layer, or with a dielectric mirror, for example, made of aluminum oxide/Si.

FIGS. 3A, 3B and 3C show simplified views of three further variants for suppressing laser stray light. In the variant in FIG. 3A, the glass prism 38A is provided with an absorbent layer 44A instead of with a mirror 44. In the configuration in FIG. 3B, the glass prism 38B is embodied as a 45° mirror whose mirrored surface 44B reflects away laser stray light in the upward direction. The surface 44B can be embodied as a standard mirror with a metallic or dielectric coating, or can be provided with an absorbent coating. FIG. 3C shows a refinement of the configuration of FIG. 3B in which the 45° mirrored surface 44C of the glass prism 38C is directed in the downward direction. That is to say, the mirrored surface 44C deflects laser stray light into the substrate where it is absorbed. Here too, the surface 44C can either be mirror-coated or can be provided with an absorbent layer.

Again with respect to FIGS. 1 and 2, the silicon substrate 12 thus functions not only as a carrier for the glass prisms 36, 38 which are arranged on it, and as a carrier for the laser diode 30 and for the IC 42, but also functions as a heat sink and as a substrate for a PIN photodiode array which includes the monitor photodiodes 18 and the signal diodes 20 and 22. The monitor photodiodes 18 are arranged in the vicinity of the laser diode 30 and measure the backward reflection of one of the optical components in order to regulate the laser power.

Figure 4:
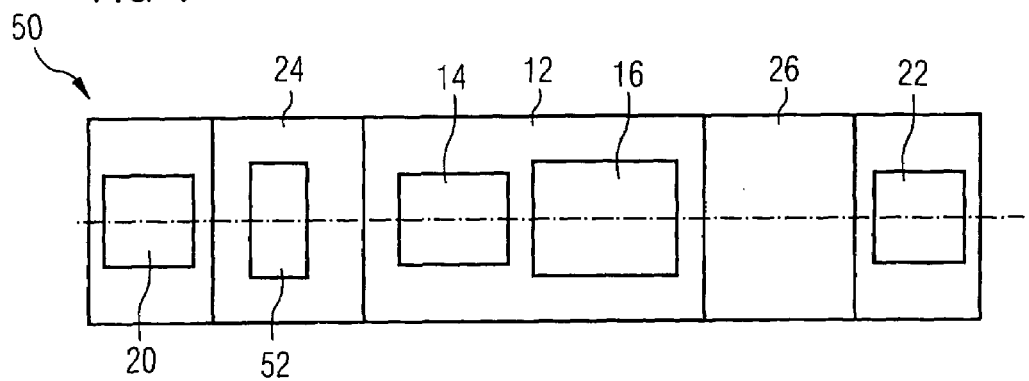
FIG. 4 is a plan view of a second exemplary embodiment of a silicon submount.
Figure 5:
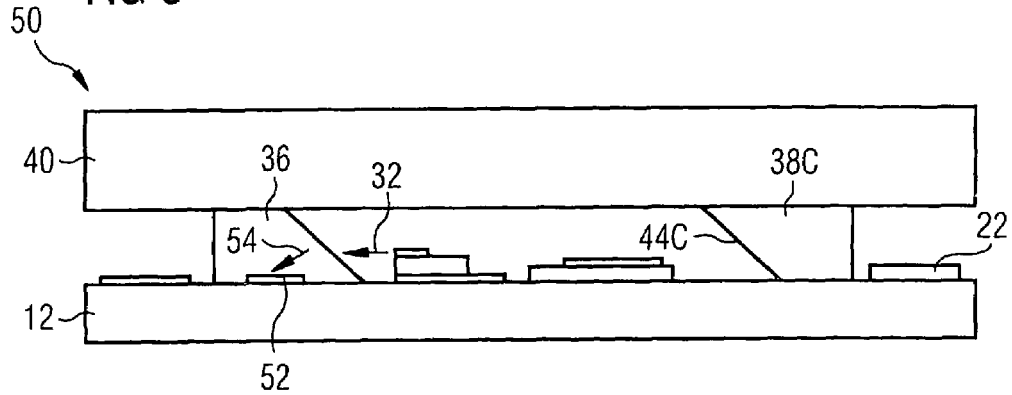
FIG. 5 is a sectional view taken through the silicon submount in FIG. 4.
Figure 12A:
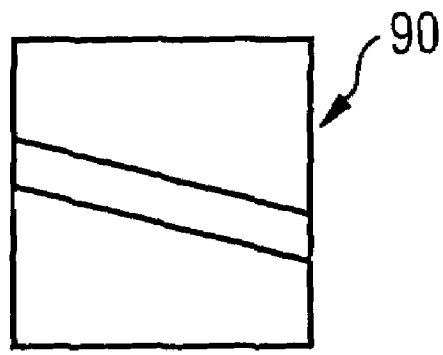
FIGS. 12A, 12B, 12C, and 12D show four variants of the embodiment of the signal diodes in each of the silicon submounts.
Figure 12B:
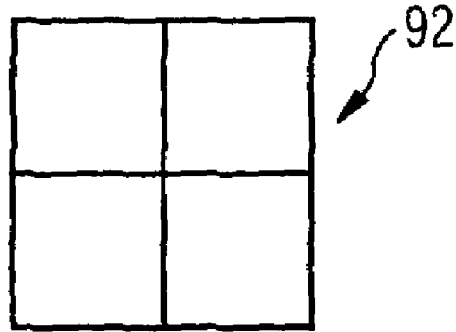
Figure 12C:
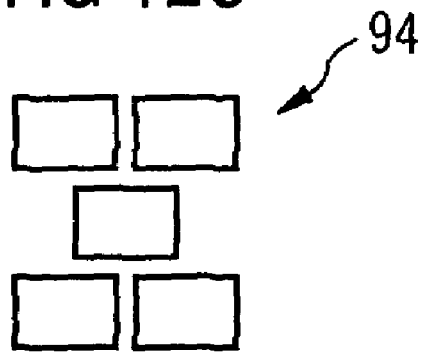
Figure 12D:
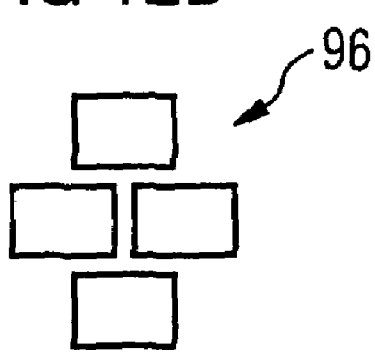

Another embodiment of a silicon submount 50 is illustrated in FIGS. 4 and 5. Here, identical reference symbols designate the same elements as in FIGS. 1 and 2. The silicon submount 50 differs from the silicon submount 10 in particular through the arrangement of the monitor photodiode 52. The monitor photodiode 52 is arranged under the deflection prism 36 in this exemplary embodiment. The monitor photodiode 52 obtains, as a monitor signal, the part 54 of the laser radiation 32 that is let through by the mirror-coated surface of the deflection prism, and that is reflected in the direction of the monitor diode 52.

Furthermore, for reducing the stray light, the exemplary embodiment in FIG. 5 implements the variant shown in FIG. 3C in which the prism 38C, which also serves as a supporting element, is embodied as a deflection element with a mirrored surface 44C which is inclined at an angle of 45° with respect to the substrate 12.

FIGS. 6 and 7 show a further exemplary embodiment of a silicon submount 60. Here too, identical reference symbols designate the same elements as in the silicon submount 10 shown in FIGS. 1 and 2. In the silicon submount 60, instead of the pair of signal detectors 20 and 22 in FIG. 1, a single signal detector 62 performs all the functions for tracking, measurement of the signal level and focusing. The monitor diode 64 is arranged here directly downstream of the first chip bonding surface 14 in the direction that is opposite to the irradiation direction of the laser.

FIG. 8 shows a refinement of the configuration in FIG. 7 in which the second supporting element 74 is bonded onto the substrate 12 in the irradiation direction, downstream of the single signal detector 62. The arrangement of the other elements corresponds to that in FIG. 7.

A further exemplary embodiment of the invention is illustrated in FIGS. 9 and 10. In the case of the silicon submount 80, in addition to the glass bonding surface 82 which is used to hold the deflection prism 84, a further glass supporting point is dispensed with. The deflection prism 84 thus constitutes the single supporting element for the optical component 40. The arrangement and configuration of the signal diodes 20, 22 corresponds, in the exemplary embodiment shown, to that of FIG. 1, and the arrangement and configuration of the monitor diode 64 corresponds to that of FIG. 6.

A further exemplary embodiment of the invention is illustrated in FIG. 11. The supporting elements 38D, 38E are arranged at the side of the deflection mirror 136, and the detectors 20, 22 are installed between the mirror 136 and the supporting elements 38D, 38E. The optical element 40 is mounted on the supporting elements.

FIGS. 12A, 12B, 12C, and 12D show four variants of the embodiment of a signal detector array 90, 92, 94 or 96. Each of these arrays permits good measurement of the tracking, spacing and signal level of the reflected laser light and can be used for one of the signal detectors 20, 22 and 62 of the silicon submounts discussed above.

The fabrication of the glass prisms and the mounting of the glass prisms on the silicon submount will now be explained with reference to FIGS. 13A–13E. Here, the fabrication of the submounts is carried out in the wafer composite, for example, on 150 mm or 200 mm wafers. It is possible to arrange, for example, 1500 submounts on a 150 mm wafer.

Figure 13A:
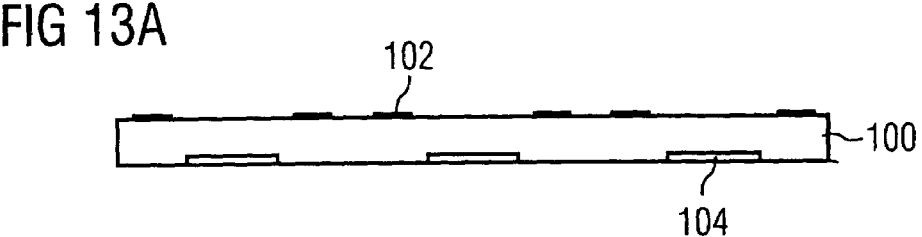
FIGS. 13A–13E show the intermediate steps of the method for fabricating the glass prisms and mounting the glass prisms on a silicon submount.
Figure 13B:
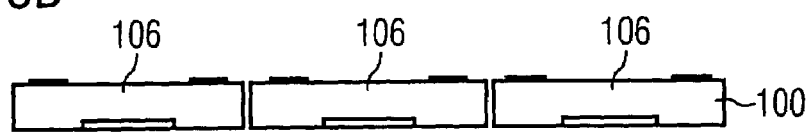

FIG. 13A is used to illustrate that in a first working step, regions 102 that will later be used as soldering surfaces for connecting the optical component 40 are metalized onto a glass wafer 100. Then, approximately 20 μm-deep trenches 104 are made on the rear side of the glass wafer 100 by sandblasting. Then, the glass wafer 100 is sawn so that a multiplicity of individual strips 106 is produced, FIG. 13B.

Figure 13C:
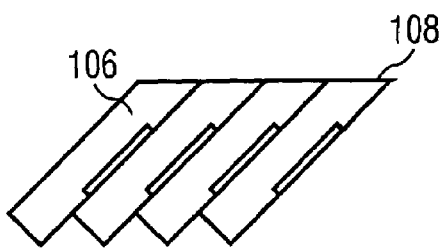
Figure 13D:
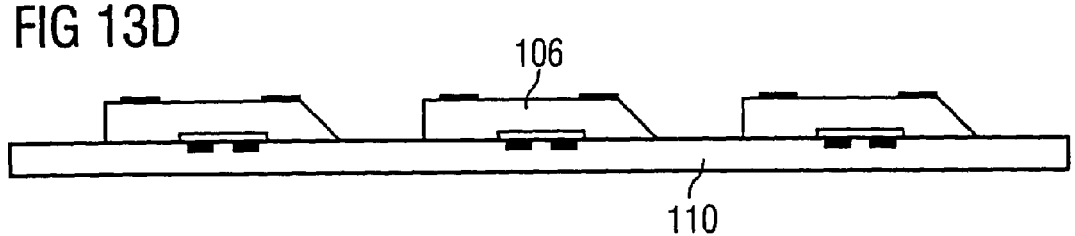

Then, as shown in FIG. 13C, surfaces 108 are ground to 45° jointly on a plurality of the strips 106. These surfaces 108 are polished in the next working step and are coated with a highly reflective mirror for deflecting laser beams. The prisms are then oriented on a silicon wafer 110 and are anodically bonded as shown in FIG. 13D.

Figure 13E:
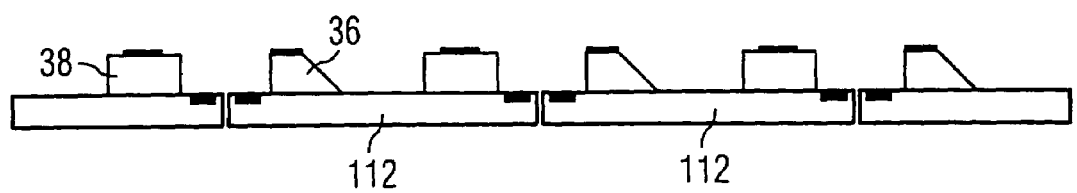

Through various further sawing steps, the glass center part is respectively cut out so that a deflection prism 36 and a further supporting element 38 are produced from each glass strip 106. The individual submounts 112 are also separated from one another as shown in FIG. 13E. Here, the submounts 112 are first still held on a film and are then placed in the sensing head housing using a pick & place in a manner known per se.

The explanation of the invention with reference to the exemplary embodiments should of course not be understood as a restriction to the exemplary embodiments. Instead, the invention includes the disclosed features both individually and in any combination with one another, even if these combinations are not explicitly specified in the claims.

We claim:

1. An optical sensing head for sensing laser radiation reflected by an optical data memory and for reading out the optical data memory, the optical sensing head comprising:

a substrate having a main surface extending along a first main plane;

an edge-emitting laser component for emitting laser radiation along an irradiation axis oriented essentially parallel to said first main plane, said laser component configured on said main surface of said substrate;

a deflection device configured on said main surface of said substrate, said deflection device for providing deflected laser radiation in a direction essentially perpendicular to said main surface by deflecting the laser radiation emitted by said laser component;

at least one signal detector for sensing the laser radiation reflected by the optical data memory;

an optical element for guiding the deflected laser radiation to the optical data memory and for guiding the laser radiation reflected by the optical data memory to said signal detector; and a supporting element connecting said optical element to said substrate;

at least one of said supporting element and said deflection device being produced from glass and being nondetachably connected to said substrate by an anodic bond.

2. The optical sensing head according to claim 1, wherein said deflection device also serves as a supporting element for connecting said optical element to said substrate.

3. The optical sensing head according to claim 1, wherein:
said signal detector is an irradiation-direction signal detector configured on said main surface of said substrate;
said irradiation-direction signal detector is configured on said irradiation axis of said laser component; and
said irradiation-direction signal detector is configured downstream of said deflection device with respect to a direction of irradiation of the laser radiation emitted by said laser component.

4. The optical sensing head according to claim 1, further comprising:
an opposite-direction signal detector configured on said main surface of said substrate;
said opposite-direction signal detector configured on said irradiation axis of said laser component; and
with respect to said laser component, said opposite-direction signal detector configured in a direction opposite to a direction of the laser radiation emitted by said laser component.

5. The optical sensing head according to claim 4, wherein said supporting element is configured between said laser component and said opposite-direction signal detector.

6. The optical sensing head according to claim 5, wherein:
said supporting element, which is configured between said laser component and said opposite-direction signal detector, has a surface facing said laser component; and
said surface of said supporting element has a metallic or dielectric mirrored layer.

7. The optical sensing head according to claim 5, wherein:
said supporting element, which is configured between said laser component and said opposite-direction signal detector, has a surface facing said laser component; and
said surface of said supporting element has an absorption layer.

8. The optical sensing head according to claim 5, wherein said supporting element, which is configured between said laser component and said opposite-direction signal detector, is embodied as a deflection device for deflecting stray light of said laser component away from said opposite-direction signal detector.

9. The optical sensing head according to claim 5, wherein said supporting element, which is configured between said laser component and said opposite-direction signal detector, is embodied as a deflection device for deflecting stray light of said laser component away from said opposite-direction signal detector in a direction essentially perpendicular to said main surface.

10. The optical sensing head according to claim 1, wherein said signal detector is formed in said substrate.

11. The optical sensing head according to claim 10, wherein said signal detector includes an array of PIN photodiodes formed in said substrate.

12. The optical sensing head according to claim 1, further comprising:
a monitor detector for checking an irradiation power of said laser component;
said monitor detector integrated on said substrate.

13. The optical sensing head according to claim 1, further comprising:
a plurality of detectors, said plurality of detectors including said at least one signal detector;
a plurality of supporting elements;
said deflection device embodied as a deflection mirror;
said plurality of supporting elements configured beside said deflection mirror;
said plurality of detectors configured between said deflection mirror and said plurality of supporting elements;
said optical element mounted on said plurality of supporting elements.

14. The optical sensing head according to claim 1, wherein said substrate is formed by a silicon substrate.

15. The optical sensing head according to claim 1, wherein said main surface of said substrate has an area of 10 mm$^3$ or less.

16. A method for fabricating an optical sensing head, which comprises:
providing the optical sensing head according to claim 1; and
fabricating the deflection device by:
sawing a glass wafer into individual strips,
obtaining ground surfaces by grinding surfaces onto the strips at a predetermined angle,
coating the ground surfaces with a highly reflective mirrored layer to obtain deflection prisms for deflecting laser beams, and
nondetachably orientating and connecting the deflection prisms to the substrate, and carrying out the connecting by anodic bonding.

17. The method according to claim 16, which further comprises:
before performing the step of sawing the glass wafer, metalizing regions on a front side of the glass wafer;
the regions providing soldering surfaces for connecting optical components to the substrate after performing the step of connecting the deflection prisms to the substrate.

18. The method according to claim 16, which further comprises:
before performing the step of sawing the glass wafer, introducing trenches into a rear side of the glass wafer by sandblasting.

19. The method according to claim 16, which further comprises:
when performing the step of fabricating the deflection device, concurrently fabricating supporting elements from the glass wafer.

20. The method according to claim 16, which further comprises:
forming an array of PIN photodiodes in the substrate;
the PIN photodiodes serving as a signal detector or as a plurality of signal detectors.

21. The method according to claim 16, wherein the predetermined angle is approximately 45°.

* * * * *

UNITED STATES PATENT AND TRADEMARK OFFICE
CERTIFICATE OF CORRECTION

| | | |
|---|---|---|
| PATENT NO. | : 7,223,952 B2 | Page 1 of 1 |
| APPLICATION NO. | : 10/667717 | |
| DATED | : May 29, 2007 | |
| INVENTOR(S) | : Ulrich Steegmüller et al. | |

It is certified that error appears in the above-identified patent and that said Letters Patent is hereby corrected as shown below:

Column 8,

Line 23, "$mm^3$" should read -- $mm^2$ --

Signed and Sealed this

Twenty-first Day of August, 2007

JON W. DUDAS
*Director of the United States Patent and Trademark Office*